Oct. 28, 1952        W. E. SHENK        2,616,016

ROTARY ELECTRIC RESISTANCE WELDER

Filed June 12, 1951        3 Sheets-Sheet 1

Inventor
WILLIAM E. SHENK

Francis J. Klempay
Attorney

Oct. 28, 1952 W. E. SHENK 2,616,016
ROTARY ELECTRIC RESISTANCE WELDER
Filed June 12, 1951 3 Sheets-Sheet 2
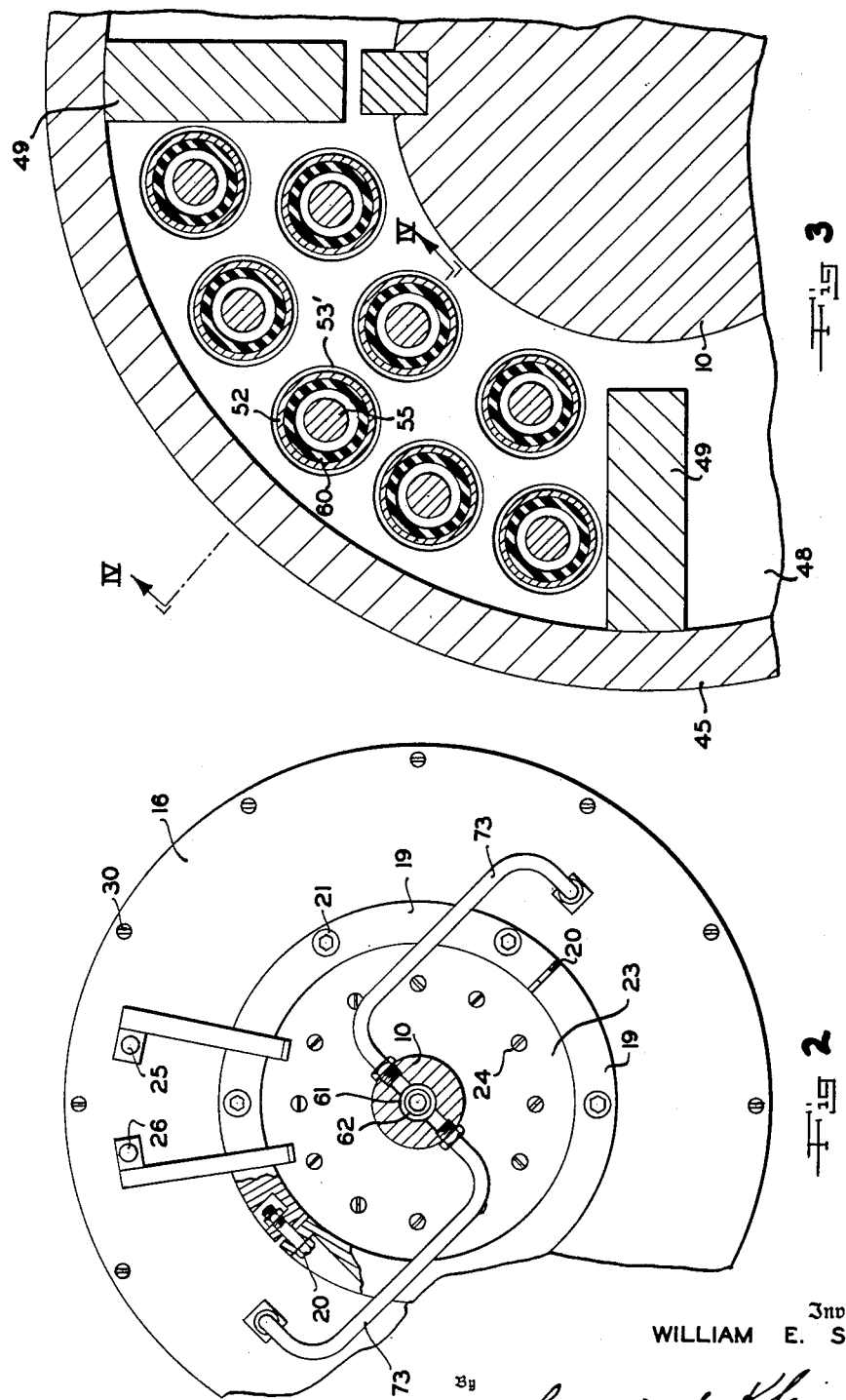
Inventor
WILLIAM E. SHENK
By Francis J. Klempay
Attorney

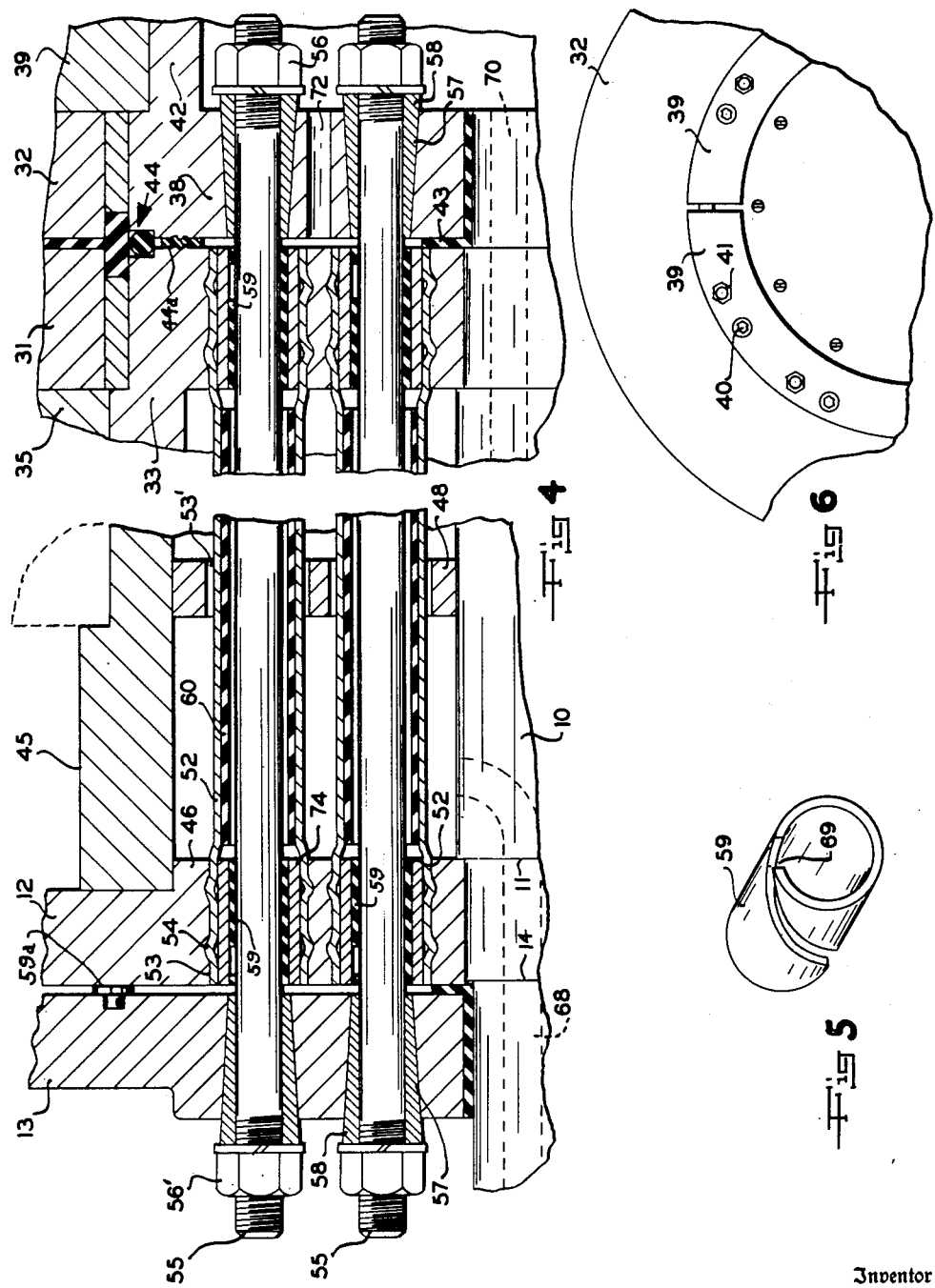

Patented Oct. 28, 1952

2,616,016

UNITED STATES PATENT OFFICE 2,616,016

ROTARY ELECTRIC RESISTANCE WELDER

William E. Shenk, Hubbard, Ohio, assignor to The McKay Machine Company, Youngstown, Ohio, a corporation of Ohio Application June 12, 1951, Serial No. 231,219

11 Claims. (Cl. 219—6)

This invention relates to a rotary electric resistance welder having particular, but not exclusive application in continuous mills for producing steel tubing by the longitudinal-seam butt-welding method. The object of the present invention is the provision in such rotary welding apparatus of an improved transformer and welding electrode assembly whereby a more rugged and durable rotating unit is provided but in which, nevertheless, the electrical $I^2R$ losses and reactance are very materially reduced in comparison with similar prior machines, in which there is less deflection of parts and easier alignment with the stock being welded, in which there is greater economy in the use of copper even in machines of large size, and in which the mechanical design features can be integrated with the mill housing, adjustments, etc. in a wholly practical and improved manner. Another object of the invention is the provision in rotary apparatus of the kind described of improved arrangements for cooling those parts which are subject to heavy current densities and thus generate substantial quantities of heat.

Rotary transformer and electrode assemblies have been commonly used for some time in such applications as the continuous production of metal tubing by the butt-weld process and in the operation of such plants it has been found convenient to mount the revolving wheel electrodes in an overhanging relation to facilitate their removal and replacement and to provide better visibility of the welding zone. Other considerations require that the welding wheels be firmly supported at a closely adjacent point and this necessitates the positioning of a bearing axially intermediate the bulky transformer and the wheel electrodes and there is thus formed, in effect, a throat or neck in the assembly which revolves inside this bearing. Heretofore, the dimensional restriction of this throat portion of the rotary assembly has presented grave problems of physical instability and substantial electrical losses which have decreased the efficiency of the apparatus while restricting its practicability to large-sized mills. The designs available to the prior art necessitated a compromise between maximum copper utilization of the cross sectional area of the throat within the bearing and utilization of this space by the more rigid steel shafts or other load bearing axial members. Upon the throat construction being too "soft" the wheel electrodes readily become misaligned and difficulty is encountered in properly tracking the continuously advancing formed and closed skelp while upon sufficient utilization of the space by steel load bearing members to keep deflection and misalignment within practical limits the current density and reactance in the current carrying circuit of the throat is such as to substantially reduce the electrical efficiency of the assembly and to raise the problem of cooling.

The present invention overcomes the above outlined problems heretofore encountered in the design and construction of combined rotary transformer and wheel electrode units. The present invention provides an improved circuit arrangement positioned within the throat of the rotating unit and operative to electrically interconnect the terminals of the secondary winding of the transformer with the electrodes whereby the current densities are greatly reduced to minimize $I^2R$ losses and whereby the reactance in the throat of the machine is also materially reduced. This latter feature is of major importance in modern high-speed equipment where in order to achieve an acceptable close spacing of the weld spots in the tube or other product being produced it is necessary to increase the frequency of the alternating current supply. It is now often desirable to operate these mills at 180 cycles/sec., for example. The invention also provides improved means for cooling the electrodes, the throat, and the transformer proper of the assembly and improved arrangements for fitting together and electrically interconnecting the separate parts of the welding current circuit so as to again reduce the electrical losses caused by the resistance of these joints.

A further object of the invention is the provision in rotary apparatus of the character described of improved mechanical structure whereby the deflection and wear of the parts is kept to a minimum and whereby an extremely rigid mechanical and electrical bond is effected between the transformer secondary and the electrodes so that the unit is operable with less maintenance and repair over long periods of time.

The above and other objects and advantages of the invention will become apparent upon consideration of the following detailed specification and the accompanying drawing wherein there is disclosed a preferred embodiment of the invention.

In the drawing:

Figure 2 is a fragmentary sectional view taken along line II—II of Figure 1;

Figure 3 is an enlarged fragmentary sectional view taken along line III—III of Figure 1;

Figure 4 is a fragmentary sectional view taken along line IV—IV of Figure 3 showing details of the throat construction as according to the invention;

Figure 5 is a perspective view of an insulating bushing used in the construction shown in Figure 4; and Figure 6 is a fragmentary front elevation of the apparatus of Figure 1 showing an improved construction technique as utilized therein.

Figure 1:
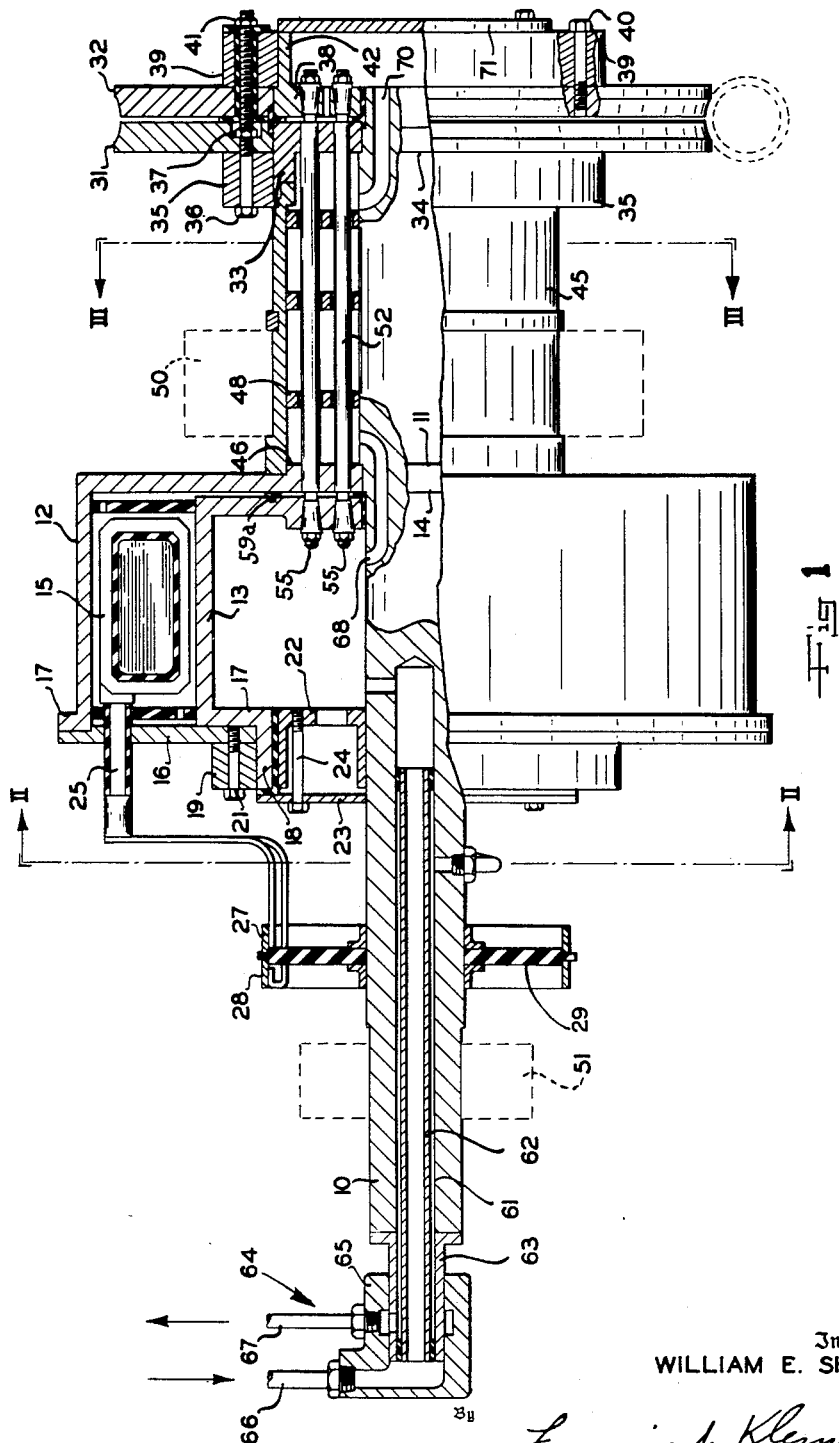
Figure 1 is an axial view, partly in section, of a rotary resistance welding transformer constructed according to the principles of my invention.

Referring to the various figures of the drawing the reference numeral 10 denotes an elongated supporting shaft of steel or other suitably rigid material which carries the principal elements of my apparatus. Positioned on the shaft 10, in engagement with a shoulder 11 thereof, is a cup-shaped housing 12 which forms a portion of the secondary circuit as will be apparent. A second housing 13 is positioned on the shaft 10 in insulated relation thereto and in engagement with a shoulder 14 which is spaced axially of the shoulder 11 in order to provide axial separation between the said housings 12 and 13. The outer periphery of the second housing 13 is positioned substantially radially inward of the inner wall of the outer housing 12 to thus form an annular enclosure for the reception of a primary winding 15. The left hand or open end of the said enclosure is sealed in a fluid tight manner by means of an annular cover plate 16. Circumferentially spaced bolts 30 secure the cover plate 16 to flanges 17 and 18 which extend outwardly of the outer housing 12 and inwardly of the inner housing 12 as shown. The three members 12, 13 and 16 thus form a secondary loop about the winding 15. Experience has shown, however, that unless very accurate machine work is done on the parts it is difficult to obtain uniform electrical contact between the adjoining faces of the cover plate 16 and the flange 17. Thus it is not uncommon for "hot spots" to occur due to the uneven distribution of current. This is of course undesirable since it causes distortion of the parts and correspondingly high stresses throughout the structure. To avoid this I have provided a contact wall 18 which extends axially from the flange 17. A split collar 19 (see Figure 2) is positioned upon the extending wall 18 and is clamped tightly thereto by means of bolts 20. A plurality of circumferentially spaced bolts 21 is utilized to secure the collar 19 to the cover plate 16 in conducting relation.

To support the left hand end of the inner housing 13 I have provided a spider 22 which is slidably supported on the shaft 10 and which is rigidly secured to the inner surface of the wall 18 in insulated relation thereto. This construction renders the housing structure free to expand and contract under changes in temperature in a substantially stress-free manner. A cover plate 23 encloses the open end of the housing 13 and is secured thereto in fluid-tight insulated relation by means of bolts 24 which are threadedly received in the spider 22. Suitable gasket means, not shown, positioned between the cover plate 23 and the shaft 10, provide a fluid seal therebetween.

Connecting the primary winding 15 to a source of current I provide conductors 25 and 26 which extend from the cover plate 16 in insulated and fluid-tight relation thereto and which are connected to slip rings 27 and 28 respectively. The slip rings are supported in concentricity with the shaft 10 by a web 29 of non-conducting material in a well known manner. Suitable brushes, not shown, which connect the source of current, also not shown, are then adapted to yieldably bear upon the rings 27 and 28 to complete the primary circuit.

Included in the secondary circuit are, of course, electrode wheels 31 and 32 which are connected with the housings 12 and 13 respectively as will be explained. The inner wheel 31 is supported upon a ring member 33 which is in turn supported directly on the shaft 10, in axial engagement with a shoulder thereof. The ring member 33 is of highly conductive material and has an axially extending wall to receive a split collar 35 to insure uniform contact as explained. Suitable bolts, not shown, apply tangential pressure to the collar 35 while bolts 36 and nuts 37 serve to rigidly secure the said collar to the electrode wheel 31. It will be noted that the collar 35 has an inwardly extending flange which is adapted to bear against the end face of the ring member 33 to thus provide means of positively positioning the electrode wheel 31 with respect to the said ring member and thus with the shaft 10.

Retained on the end of the shaft 10 in insulated relation thereto is a second ring member 38 which is retained in axially spaced relation to the first ring member 33 by means of suitable non-conductive separators as shown. The ring member 38 is also provided with an axially extending wall 42 which is adapted to retain a split collar 39 in conducting relation. Bolts 40 are utilized to secure the collar 39 to the electrode wheel 32 and threaded extensions of the bolts 36 are engaged by nuts 41 to thus rigidly connect the collars 35 and 39 and the electrodes 31 and 32. The said threaded extensions and nuts 41 are, of course, retained in insulated relation with respect to the outer electrode 32 as shown to avoid short circuiting the apparatus. It will be observed that a shoulder is formed at the junction of the wall 42 with the body portion of the ring member 38 to provide means of positively positioning the collar 39 and electrode 32 with respect to the said ring member 38. Thus it may be understood that tightening of the nuts 41 on the bolts 36 will secure the electrodes 31 and 32, the collars 35 and 39, and the ring members 33 and 38 as a rigid unit each half of which is maintained electrically separate by means of non-conductive separators 43 and 44a (Figure 4). The said separators 43 and 44a further serve as fluid seals as will become apparent.

To rigidly and accurately position the above described electrode unit with respect to the shaft 10, and as means of properly supporting the apparatus, I have provided a neck member 45 which comprises a relatively thick walled tubular section of cast steel or other suitable material of comparative strength. The said neck member 45 is positioned in concentricity with the shaft 10 by means of a large diameter boss 46 which extends from the housing 12 and is adapted to bear against the end faces of the housing 12 and ring member 33 as shown in Figure 1. To provide radial support for the neck member 45 I have provided, at axially spaced intervals, webs 48 which bear on the shaft 10 and on the inner surface of the neck member. The said webs 48 are preferably constructed of steel to increase the capacity of the structure to withstand radial loads. Axial deflection of the shaft 10 is substantially prevented by means of the steel neck member 45, but to provide further rigidity I have utilized circumferentially spaced longitudinally extending steel bars 49 which are welded to webs 48 and are in contact with the inside surface of the said neck member. Likewise these members 49 bear on the shaft 10. As shown in Figure 3 the bars are relatively deep-sectioned radially and thus effectively serve to restrain any deflection of the shaft 10 at the neck or throat section.

In accordance with usual practice the neck member 45 is adapted to retain an anti-friction bearing which, in cooperation with a second bearing 51 positioned at the left end of the shaft 10, is operative to rotatably support the entire apparatus. The preferred arrangement comprises a forward bearing 50 which is rigidly secured to the neck member 45, and a rear bearing 51 which is adapted to "float" on the shaft 10 to provide for expansion and contraction of the said shaft during use. It will be particularly noted that the novel structure of my invention provides that the entire bearing load be supported on steel members rather than on relatively weak copper current conducting members as has heretofore been common.

Electrical connection between the housings 12 and 13 and the electrodes 31 and 32 is provided as shown in Figure 4. Communicating with the outer housing 12 and the electrode supporting ring member 33 is a plurality of circumferentially spaced conductive tubes 52 which are preferably of copper. In order to secure the ends of the tubes 52 into the said housing 12 and ring member 33 I have bores 53 therein which are slightly larger than the diameter of the tubes 52 and which have one or more annular grooves 54 as shown. In the assembly the tubes 52 are inserted into the bores 53 and by a suitable working process the ends of the tubes are expanded into the enlarged bores 53 and the annular grooves 54 thereof. A short sleeve 74 is then forced into each end of each tube 52, the said sleeves 74 being operative to exert substantial expansive forces upon the tubes 52 to improve the strength and electrical conductivity of the joints. As shown in Figure 3, each web 48 is provided with bores 53' through which the tubes 52 pass in spaced concentric relation. The sleeves 74 are preferably of non-magnetic material having substantially the same coefficient of expansion as the housing 12. 18–8 stainless steel is suitable material for the sleeves 74.

Connecting the inner housing 13 with the ring member 38 I have provided conductive rods 55 which are threaded at each end to receive nuts 56 and 56'. In the housing 13 and ring member 32 I provide a plurality of outwardly tapering bores 57 which are adapted to receive similarly tapered conductive bushings 58. The bushings 58 are bored to slidably receive the rods 55 and thus retain the same in coaxial relation to the tubes 52. As should be apparent, tightening of nuts 56 or 56' will draw the electrodes 31 and 32, and ring members 33 and 38 toward the housings 12 and 13 to thus mechanically bind the parts in an extremely rigid and substantial manner. The tension in the conductive rods 55 further causes the tapered bushings 58 to be tightly compressed between the said rods and bores 57 to insure good electrical conductivity. Possible contact of the rods 55 with the tubes 52 is prevented by means of insulated bushings 59 and sleeves 60. To provide for the passage of cooling fluid the bushings 59 have helical openings 69 while, as shown, the sleeves 60 are spaced concentrically with respect to the rods 55.

As shown in Figure 4, there is interposed between the housings 12 and 13 a plurality of circumferentially spaced insulating buttons 59a which serve to maintain the housings 12 and 13 separated thus insuring against any short circuiting of the apparatus and the maintenance of radial passages for the cooling fluid employed regardless of the intensity of the clamping force exerted by the tie rods 55. To retain the buttons 59a in proper position a portion of the same may be press-fitted into suitable recesses formed in the housing 13, for example.

To provide an annular seal between the ring members 33 and 38 while maintaining the same in longitudinally spaced relation against the clamping action of the rods 55 to thereby also provide suitable passage for cooling fluid and insurance against short circuiting I provide in addition to the ring 44, an insulating ring 44a which is positioned between the members 33 and 38 as shown in Figure 4. The faces of the rings 33 and 38 are annularly grooved as shown to provide concentrated annular contact with the axial ends of the ring 44a to thereby provide an effective seal against the passage of cooling fluid while enabling the ring 44a to be made of quite hard material, such as Bakelite, to withstand the compressive force exerted by the tie rods 55.

It should be noted that the above described construction is highly advantageous, electrically, in that it provides a highly efficient circuit for interconnecting the transformer secondary with the welding electrodes through the principal bearing neck of the assembly. The increased efficiency results from the fact that not only is the physical circuit formed with large surface areas (as contrasted with cross sectional areas) but the physical components are arranged so as to provide a minimum of reactance in the conductive loop which is contained within the bearing neck. The reduction of reactance is highly important when utilizing frequencies considerably higher than 60 cycles per second which is now common practice in tube mills, for example. The apparatus of the invention, while minimizing the reactance factor is nevertheless acceptable as regards resistive losses, mechanical strength, and economy of materials since it is known that the depth of penetration of 60 cycle current in a conductor is only .336 inch while at 180 cycles the penetration is only .194 inch. So long as the tubular conductors have side wall thicknesses of this order and have sufficient total cross sectional area to keep the current density within reasonably low limits the circuit will perform with maximum overall efficiency. Performance tests upon the commercial model of the embodiment herein disclosed showed reactive losses to be approximately fifty percent of those occurring in prior models utilizing large conductors.

It will be understood that the operating efficiency of the above described prior arrangements may be improved from an electrical standpoint by increasing the diameter of the throat section to provide the necessary effective cross sectional area. This however is totally impractical from a mechanical standpoint since the forward bearing would be unduly large, and more important, the diameter of the electrode wheels would necessarily be so large as to distribute the welding current over a large area of the work, thus causing unsatisfactory results.

The cooling system of my apparatus comprises an elongated axial bore 61 which is provided in the shaft 10 and which extends from the left hand or rear end thereof to the inner housing 13. Positioned concentrically within the bore 61 is a tube 62 which divides the bore 61 into two fluid passages as shown. Attached to the bored end of the shaft 10 and extending rearwardly therefrom is the rotating member 63 of a conventional rotary fluid joint 64. The stationary member 65 of the said joint comprises inlet and outlet means 66 and 67 respectively which are connected to a suitable source of non-conductive cooling fluid, not shown. The outer passage formed by the tube 62 and bore 61 is closed off at each end of the tube and is in communication with the outlet 67 as shown. The inner passage formed by the said members is in communication at one end with the inlet 66 and at the other end with the enclosure formed by the housing 13 and cover plate 23. From the last mentioned enclosure the fluid passes through passage 68 into the space bounded by the shaft 10 and neck member 45. Here the fluid circulates about the exterior of tubes 52 and moves forwardly through the bores 53' of the webs 48. At the forward end of the said space the fluid passes through passage 70 into an enlarged enclosure formed by the wall 42 of the ring member 38 and an end cap 71 which is secured thereto in fluid tight relation. A plurality of circumferentially spaced bores 72 provided in the ring member 38 allow the fluid to pass into the small space defined by the ring members 33 and 38 and separators 43 and 44, and thence through the helical openings 69 into the tubes 52. At the left hand end of the tubes 52 the fluid moves radially outward between the housings 12 and 13 toward the primary winding 15. After circulating about the winding 15 it moves around the cover plate 16, through the conduits 73 and into the outlet passage of the shaft 10.

It should be noted that the structure herein disclosed provides extremely efficient cooling since the throat section, in which a major portion of the heat is usually generated, has a very large surface area in contact with the cooling fluid. In prior constructions the cooling effectiveness is substantially reduced due to the fact that the heat must first be conducted to the surface of the relatively bulky conductors before it may be removed by the fluid.

From the foregoing it should be apparent that I have accomplished the objects initially set forth. By incorporating the novel structure of my invention into rotary transformers of the type herein described it is possible to materially increase the effectiveness and operating efficiency of the apparatus. My novel throat construction utilizing a plurality of relatively small conductors provides a large surface area and consequently an increased effective cross sectional area notwithstanding the fact that a substantially smaller amount of expensive copper metal is used as compared with prior arrangements. The increased effective area, of course, results in substantially lower heat losses throughout the apparatus and accordingly lessens the burden of cooling. Another important effect of my construction is that due to the relatively small amount of current flowing through each of the sets of concentric conductors the reactive losses at the throat are substantially reduced. Thus it is possible to use a much lower terminal voltage to obtain the required electrode voltage.

Mechanically my construction has many advantages over prior types. The tubes 52 are merely expanded into contact with the housing 12 and ring member 33, and are thereafter securely locked in place by means of sleeves 74 which are forced into position and are adapted to exert a large expansive force upon the tubes 52. The rods 55 which connect the housing 13 and ring member 38 are of the utmost simplicity and the use of tapered bushings 58 insures intimate metal-to-metal contact as the nuts 56 or 56' are drawn tight. Another advantage of the use of the rods 55 is that the aggregate force of the many rods rigidly binds the electrode wheels to the housings 12 and 13. As described, the electrode wheels 31 and 32, collars 35 and 39, and ring members 33 and 38 form an independent structural unit. The rods then serve to draw this said unit into contact with the shoulder 34 of the shaft 10, and the forward face of the steel neck member 45. The housing 12 is similarly drawn against the shoulder 11 and the rear face of the neck member. Thus the entire unit is held securely and accurately in relation to the shaft 10. As regards this feature of the rods 55, it is also contemplated that the conductive rods herein disclosed may be replaced by smaller rods of steel within a tubular sheath of conductive material. This arrangement may provide a stronger mechanical tie while being equally effective from an electrical standpoint due to the previously described skin effect.

Another mechanical feature of my invention lies in the supporting means therefor. It will be noted that entire radial load upon the bearings 50 and 51 is supported on steel members rather than upon the relatively soft and weak copper elements of the structure. The rear bearing 51 is, of course, supported directly upon the shaft 10, while the forward bearing 50 is supported upon the steel neck member 45, which in turn is supported upon the shaft 10 through the steel webs 48. The only load bearing element of the entire apparatus which is not supported directly upon a metal member is the outer electrode 32 which is necessarily supported in insulated relation to the shaft 10.

My construction has further provided a practical manner in which the forward bearing may be locked against axial movement while the rear bearing is free to float. This condition is obviously desirable since expansion and contraction of the apparatus, insofar as concerns the alignment of the electrode wheels, is effective over a relatively short distance and is thus of correspondingly low magnitude. In prior constructions it has often been impossible or commercially impractical to lock the forward bearing and thus the expansion was effective over substantially the entire length of the shaft. This, of course, tends to move the electrodes outwardly of the pass line and thus undesirably effects the quality of the weld produced.

Yet another advantage of my construction lies in improved cooling. While, as explained, there is less heat produced due to more efficient electrical characteristics, the physical structure is such that a large surface area is exposed to the cooling fluid as it passes through. The result is therefore compounded so that the apparatus may be operated at a lower temperature while using a relatively low rate of fluid circulation as compared to prior devices.

The embodiment of the invention herein shown and specifically described should, however, be considered as illustrative only since many changes may be made therein without departing from the spirit and scope of the invention. For example, the electrical circuit in the throat of the apparatus—i. e. the axial conductors which pass through the bearing 50—may be formed by providing a solid thick-walled tubular casting of copper or other highly conductive material in the side wall of which is bored a plurality of circumferentially spaced but axially extending bores in each of which is located one of the conductive rods 55. It will be understood that in this embodiment the side walls of the bores perform the current-carrying function of the tubes 52 in the principally described embodiment and again it is only necessary that the minimum side wall thickness of each such bore be of the order of .336 inch if no frequencies below 60 cycles per second are to be conducted. Also, in this embodiment, as in the first described embodiment, the inductive reactance of the circuit is at a minimum due to the large ratio of the current conductive surfaces and to the space enclosed by the loop in each of the circuit components which comprises one of the bores with a concentric rod positioned in it. The casting referred to may be separately constructed or it may be cast integrally with the parts 12 and 33 as will be understood.

Reference should be had to the appended claims in determining the scope of the invention.

I claim:

1. In a rotary electric resistance welder of the kind having a centrally disposed shaft for the support of the transformer and electrodes and a supporting bearing positioned axially intermediate the transformer and electrodes a secondary winding for said transformer having terminal portions in the form of axially adjacent but relatively insulated disc-like members seated on said shaft, means mounting a pair of wheel-type electrodes on the end of said shaft comprising a pair of disc-like mounting and conducting members seated on said shaft, a bearing-supporting sleeve concentrically disposed about said shaft and partially received in shoulders formed in the innermost pair of said members, said innermost members having a plurality of circumferentially spaced but axially aligned apertures disposed radially between said shaft and sleeve, metallic current conductive tubes having their end portions expanded in said apertures, the outermost of said members each having a plurality of outwardly tapering apertures therein aligned axially and circumferentially with said tubes, current conductive rods disposed concentrically within said tubes, annular current conductive wedges surrounding the end portions of said rods and partially received within said outwardly tapering apertures, and screw-threaded means on the ends of said rods to engage the outer ends of said wedges to draw the same inwardly while placing said rods under tension.

2. In a rotary electric resistance welder of the kind having a centrally disposed supporting shaft and axially spaced transformer and wheel electrodes to provide therebetween a bearing neck means electrically interconnecting said transformer and said electrodes comprising a plurality of elongated connector members disposed substantially parallel with said shaft and spaced circumferentially about the same, each of said connector members comprising a current conductive tube electrically connected at one end to one terminal of the transformer and at the other end to one of the electrodes and a current conductive rod concentrically disposed within said tube and electrically connected at one end to the other terminal of said transformer and at the other end to the other of said electrodes.

3. Apparatus according to claim 2 further including insulating sleeves positioned between the tube and the rod in each connector member, said sleeves having axial passages therethrough whereby a cooling fluid may be passed longitudinally through the annular interstice between the tube and rod in each connector member.

4. Apparatus according to claim 3 further including means providing a fluid-receiving pocket contiguous to the outer face of the outermost electrode, said transformer having cooling passages therethrough, a sleeve encasing said connector members and extending between said transformer and electrodes, and means comprising fluid passages in said shaft and the annular space between said sleeve and shaft to conduct cooling fluid in series through said space, said pocket, the annular interstices between said tubes and rods, and the cooling passages in said transformer.

5. In a rotary resistance welder having a welding transformer with a pair of disc-like secondary terminal pads disposed in parallel radial planes but axially insulated from each other, a pair of wheel electrodes axially spaced from said pads and also disposed in parallel radial planes and axially insulated from each other, and means electrically interconnecting said pads and electrodes comprising a plurality of axially disposed but circumferentially spaced current conductive tubes rigidly connected at one end to one of said pads and at the other end to one of said electrodes and a current conductive rod concentrically disposed within each tube and rigidly connected at one end to the other of said pads and at its other end to the other of said electrodes.

6. Apparatus according to claim 5 further including a sleeve concentrically disposed about the axis of rotation of the welder and bearing at one end against one of said pads and at the other end against one of said electrodes, and screw-threaded means on said rods operative to clamp said electrodes, sleeve, and pads together into a rigid unitary assembly.

7. Apparatus according to claim 6 further characterized in that said pads and electrodes are centrally apertured, and further including a supporting shaft received in said apertures, said supporting shaft having shoulders against which said pads and electrodes are drawn upon tightening the screw-threaded means on said rods.

8. In a rotary resistance welder having a welding transformer with a pair of disc-like secondary terminal pads disposed in parallel radial planes but axially insulated from each other, a pair of wheel electrodes axially spaced from said pads and also disposed in radial planes and axially insulated from each other, means electrically connecting one of said pads with one of said electrodes comprising an axially extending current-conductive assembly having a plurality of circumferentially spaced bores therethrough, and means electrically connecting the other of said pads with the other of said electrodes comprising a current-conductive rod positioned concentrically in each of said bores.

9. In a rotary resistance welder having a supporting shaft, a welding transformer mounted on said shaft, a pair of wheel electrodes mounted on said shaft in axially spaced relation to said transformer and disposed in parallel radial planes and axially insulated from each other, means to electrically connect one of the terminals of said transformer with one of said electrodes comprising a current-conductive assembly spaced concentrically about said shaft and axially interposed between the terminal and the electrode, said assembly having a plurality of circumferentially spaced bores extending axially therethrough, and means to electrically connect the other of the transformer terminals with the other of said electrodes comprising a current-conductive rod positioned concentrically within each of said bores.

10. In a rotary electric resistance welder of the kind having a centrally disposed shaft for the support of the transformer and electrodes and a supporting bearing positioned axially intermediate the transformer and electrodes a pair of disc-like secondary terminal pads for the transformer mounted in axially spaced and insulated relation on said shaft, said electrodes being a pair of wheel-type electrodes also rigidly mounted on said shaft in axially spaced and insulated relation, a bearing mounting sleeve disposed concentrically about said shaft and extending axially from one of said pads to one of said electrodes, an annular web mounted on said shaft axially intermediate said one of said pads and one of said electrodes and tightly received within said sleeve whereby radially inward forces applied to said sleeve are transmitted to said shaft, said web having a plurality of circumferentially spaced apertures therein, current conductive tubes extending through said apertures and rigidly connected at one end to the said one of said pads and at the other end to the said one of said electrodes, and a current conductive rod concentrically disposed within each of said tubes and rigidly connected at one end to the other of said pads and at its other end to the other of said electrodes.

11. Apparatus according to claim 10 further characterized in that said shaft is formed with shoulders to restrain longitudinal sliding movement thereon of said pads and of said electrodes in a direction toward each other, said other of said electrodes having apertures therein through which said rods extend, and the extended ends of said rods having screw-threaded means thereon whereby said shaft, pads, electrodes and sleeve may be clamped together into a rigid rotating beam-like structure.

WILLIAM E. SHENK.

REFERENCES CITED

The following references are of record in the file of this patent:

UNITED STATES PATENTS

| Number | Name | Date |
|---|---|---|
| 2,265,627 | Caputo | Dec. 9, 1941 |
| 2,370,485 | Nichols | Feb. 27, 1945 |